United States Patent
Wada et al.

(10) Patent No.: US 6,429,164 B1
(45) Date of Patent: Aug. 6, 2002

(54) HIGH FREQUENCY DIELECTRIC CERAMIC COMPOSITION, DIELECTRIC RESONATOR, DIELECTRIC FILTER, DIELECTRIC DUPLEXER, AND COMMUNICATION SYSTEM

(75) Inventors: Takaya Wada, Omihachiman; Nobuyuki Sakai, Kyoto; Hitoshi Takagi, Omihachiman, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/698,835

(22) Filed: Oct. 27, 2000

(30) Foreign Application Priority Data

Oct. 28, 1999 (JP) ............................... 11-306653
Mar. 2, 2000 (JP) ....................... 2000-057476

(51) Int. Cl.$^7$ ............................................. C04B 35/468
(52) U.S. Cl. .................... 501/139; 501/138; 361/321.5; 333/219.1; 370/276
(58) Field of Search .................. 501/138, 139; 361/321.5; 333/219.1; 370/276

(56) References Cited

U.S. PATENT DOCUMENTS 6,291,380 B1 * 9/2001 Yokoi et al. ................. 501/138

FOREIGN PATENT DOCUMENTS

| JP | 02242523 A | * | 9/1990 | ................. 501/139 |
| JP | 04167306 A | * | 6/1992 | ................. 501/139 |
| JP | 06076630 A | * | 3/1994 | ................. 501/138 |

\* cited by examiner

*Primary Examiner*—David Brunsman
(74) *Attorney, Agent, or Firm*—Dickstein, Shapiro, Morin & Oshinsky, LLP.

(57) ABSTRACT

A ceramic composition includes 100 parts by weight of a main component of the formula: $xBaO\text{-}y\{(1-\alpha)Sm_2O_3\text{-}\alpha Nd_2O_3\}\text{-}zTiO_2$, and as secondary components, about 0.3 part by weight or less of a Mn compound in terms of MnO and about 1 part by weight or less of a Ta compound in terms of $Ta_2O_5$, wherein $13 \leq x \leq 23$; $0 < y \leq 12$; $75 \leq z \leq 83$; $0 \leq \alpha \leq 1$; and $x+y+z=100$. Further, about 1.5% by mole or less o3f the Ti element is preferably replaced with Zr. The resulting high frequency dielectric ceramic composition has a high relative dielectric constant ($\in r$) and a high Q value in a microwave region, can control the temperature coefficient of resonant frequency ($\tau f$) in the vicinity of zero (ppm/°C.), and has a satisfactory thermal shock resistance.

14 Claims, 3 Drawing Sheets

HIGH FREQUENCY DIELECTRIC CERAMIC COMPOSITION, DIELECTRIC RESONATOR, DIELECTRIC FILTER, DIELECTRIC DUPLEXER, AND COMMUNICATION SYSTEM

BACKGROUND OF THE INVENTION

1. Field of the Invention

The present invention relates to a high frequency dielectric ceramic composition, and a dielectric resonator, a dielectric filter, a dielectric duplexer and a communication system using the dielectric ceramic composition.

2. Description of the Related Art

Dielectric ceramics are widely used as dielectric resonators and dielectric filters which are mounted to electronic devices employed in the microwave region millimeter wave region and other high frequency regions, such as in mobile phones, personal radios and satellite receivers. Such high frequency dielectric ceramics must have a high dielectric constant and a high Q value and must have a temperature coefficient of resonant frequency that can be optionally controlled in the vicinity of zero.

As this type of dielectric ceramic compositions, conventionally proposed are, for example, a $BaO$—$Sm_2O_3$—$TiO_2$ based composition (Japanese Unexamined Patent Application Publication No. 57-15309), a $BaO$—$Sm_2O_3$—$TiO_2$—$MnO_2$ based composition (Japanese Unexamined Patent Application Publication No. 59-14214), a $BaO$—$Sm_2O_3$—$TiO_2$—$ZrO_2$ based composition (Japanese Unexamined Patent Application Publication No. 60-3801), and a $BaO$—$Sm_2O_3$—$TiO_2$ based composition (Japanese Unexamined Patent Application Publication No. 6-111624).

However, the $BaO$—$Sm_2O_3$—$TiO_2$ based composition, the $BaO$—$Sm_2O_3$—$TiO_2$—$MnO_2$ based composition and the $BaO$—$Sm_2O_3$—$TiO_2$—$ZrO_2$ based composition respectively disclosed in Japanese Unexamined Patent Application Publications No. 57-15309, No. 59-14214 and No. 60-3801, all exhibit a significantly decreased Q value and the temperature coefficient of resonant frequency ($\tau f$) significantly shifts to the positive or negative side, when the relative dielectric constant ($\in_r$) becomes about 35 to 55. These compositions are therefore disadvantageous in practical use.

The composition disclosed in Japanese Unexamined Patent Application Publication No. 6-111624 attains a high Q value by limiting the compositional proportions of the individual components BaO, $Sm_2O_3$ and $TiO_2$. However, the resulting ceramic element made from this composition is liable to invite microcracking due to thermal shock upon soldering and lacks stability of the Q value.

SUMMARY OF THE INVENTION

Accordingly, an object of the present invention is to solve the above problems and to provide a high frequency dielectric ceramic composition which has a high relative dielectric constant ($\in_r$) and a high Q value in a microwave region, can control the temperature coefficient of resonant frequency ($\tau f$) in the vicinity of zero (ppm/°C.) and has a satisfactory thermal shock resistance, as well as to provide a dielectric resonator, a dielectric filter, a dielectric duplexer and a communication system using the dielectric ceramic composition.

Specifically, the present invention provides, in one aspect, a high frequency dielectric ceramic composition. The composition includes, as a main component, a complex oxide containing Ba, Ti and at least one of Sm and Nd as metal elements, and as secondary components, a Mn compound and a Ta compound.

In another aspect, the present invention provides a high frequency dielectric ceramic composition including 100 parts by weight of a main component containing Ba, Ti and at least one of Sm and Nd as metal elements and represented by the following formula:

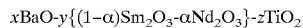

$xBaO\text{-}y\{(1-\alpha)Sm_2O_3\text{-}\alpha Nd_2O_3\}\text{-}zTiO_2$ wherein x, y, and z are % by mole, and $\alpha$ is a molar ratio, and x, y, z, and $\alpha$ satisfy the following conditions: $13 \leq x \leq 23$; $0 < y \leq 12$.; $75 \leq z \leq 83$; $0 \leq \alpha \leq 1$; and $x+y+z=100$, and, as secondary components, more than 0 and equal to or less than about 0.3 part by weight of a Mn compound in terms of MnO, and more than 0 and equal to or less than about 1 part by weight of a Ta compound in terms of $Ta_2O_5$.

The invention provides, in a further aspect, a high frequency dielectric ceramic composition including 100 parts by weight of a main component containing Ba, Ti and Sm as metal elements and represented by the following formula:

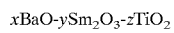

$xBaO\text{-}ySm_2O_3\text{-}zTiO_2$ wherein x, y, and z are % by mole and satisfy the following conditions: $17 \leq x \leq 19$; $1 \leq y \leq 6$; $77 \leq z \leq 81$; and $x+y+z=100$, and, as secondary components, more than 0 and equal to or less than about 0.3 part by weight of a Mn compound in terms of MnO, and more than 0 and equal to or less than about 1 part by weight of a Ta compound in terms of $Ta_2O_5$.

Of 100% by mole of the Ti element, about 1.5% by mole or less is preferably replaced with Zr.

Preferably, about 50% by mole or less of 100% by mole of the Sm element is replaced with at least one of La, Ce and Pr.

The above dielectric ceramic composition may further include, as a secondary component, about 0.5 part by weight or less of a Nb compound in terms of $Nb2O_5$, relative to 100 parts by weight of the main component.

In yet another aspect, the invention provides a dielectric resonator which is activated by electromagnetic coupling of a dielectric ceramic with an input-output terminal, in which the dielectric ceramic includes the aforementioned high frequency dielectric ceramic composition.

In the dielectric resonator, a copper plating conductor is preferably formed on a surface of the dielectric ceramic.

The present invention further provides a dielectric filter including the dielectric resonator and an external coupling device.

In still another aspect, the present invention provides a dielectric duplexer. The dielectric duplexer includes at least two dielectric filters, input-output connecting devices which are connected to each of the dielectric filters respectively, and an antenna connecting device which is connected to the dielectric filters in common, and at least one of the dielectric filters is the above dielectric filter.

In addition and advantageously, the present invention provides a communication system. The communication system includes the above dielectric duplexer; a transmitting circuit which is connected to at least one input-output connecting device of the dielectric duplexer; a receiving circuit which is connected to at least one input-output connecting device other than the input-output connecting device connected to the transmitting circuit; and an antenna which is connected to an antenna connecting device of the dielectric duplexer.

DESCRIPTION OF THE PREFERRED EMBODIMENTS

Figure 1:
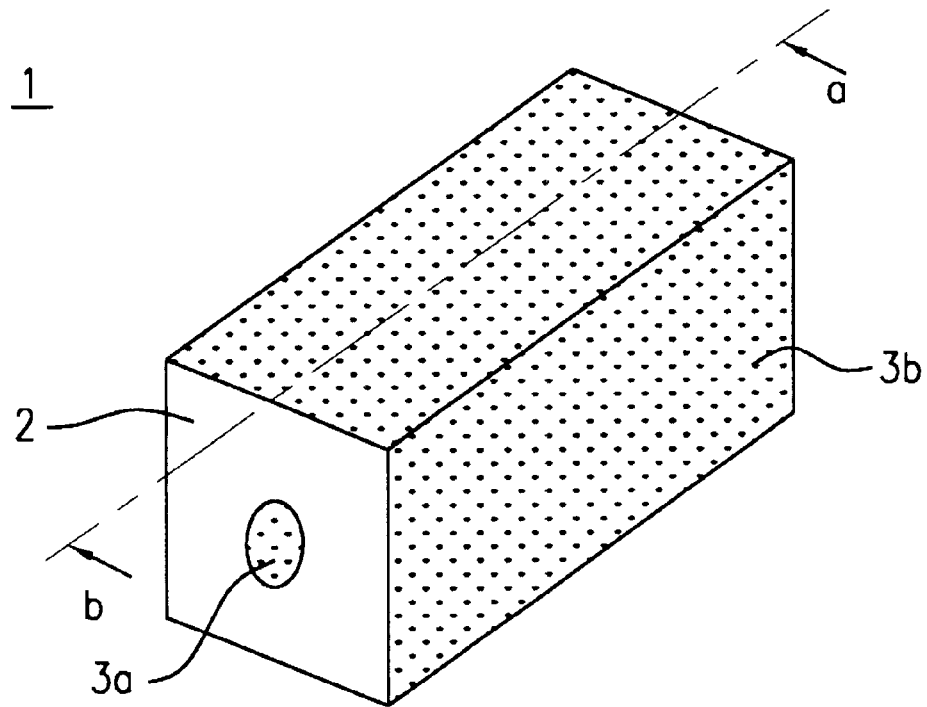
FIG. 1 is a perspective view of an embodiment of a dielectric resonator according to the present invention.
Figure 2:
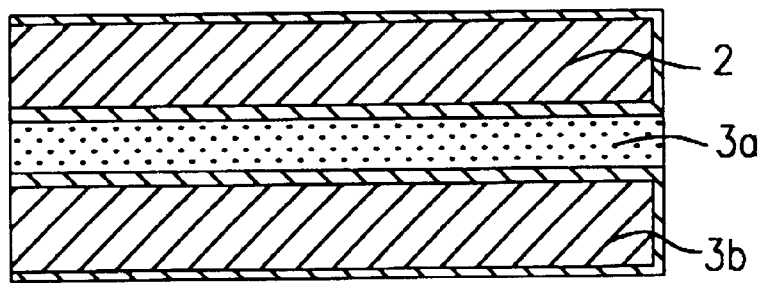
FIG. 2 is a sectional view of the dielectric resonator shown in FIG. 1 taken along the plane a-b.

FIG. 1 is a perspective view of an embodiment of the invented dielectric resonator, and FIG. 2 is a sectional view of the dielectric resonator shown in FIG. 1 taken along with the plane a-b. As illustrated in FIGS. 1 and 2, a dielectric resonator 1 includes a prismatic dielectric ceramic 2 having a through hole. An inner conductor 3a is formed inside the through hole, and an outer conductor 3b is formed around the dielectric resonator. By electromagnetic coupling of the dielectric ceramic 2 with an input-output terminal, i.e., with an external coupling means, the dielectric resonator acts as a dielectric resonator. The dielectric ceramic 2 constituting the dielectric resonator 1 is composed of the invented high frequency dielectric ceramic composition.

The inner conductor 3a and the outer conductor 3b formed on a surface of the dielectric ceramic 2 may be made of copper plating. By this configuration, the productivity can be increased to thereby reduce production costs.

A prismatic dielectric resonator of transverse electromagnetic mode (TEM mode) is illustrated in FIG. 1, but the present invention is not limited to this type of dielectric resonator. Naturally, the invented high frequency dielectric ceramic composition can also be applied to dielectric resonators having the other configurations and to those of the other TEM modes, transverse magnetic mode (TM mode), transverse electric mode (TE mode) and other modes.

Figure 3:
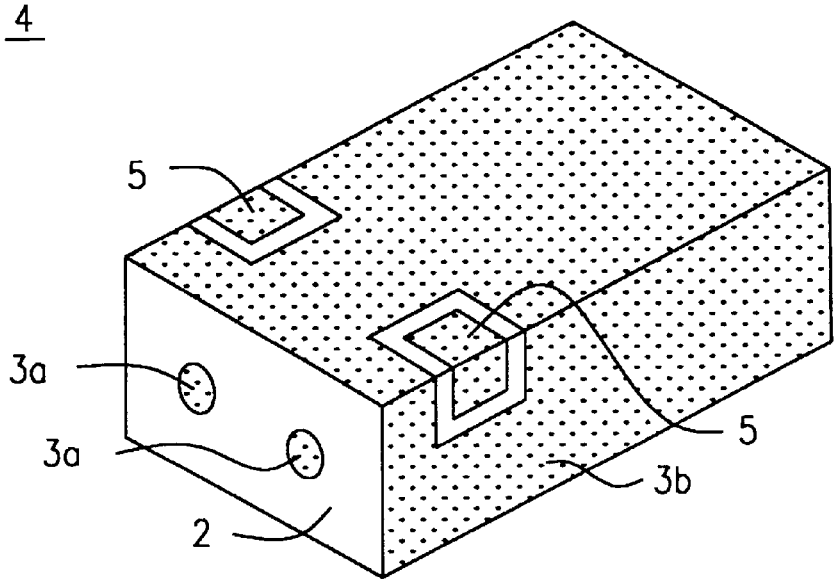
FIG. 3 is a perspective view of an embodiment of a dielectric filter according to the present invention.

FIG. 3 is a perspective view of an embodiment of the invented dielectric filter. As illustrated in FIG. 3, a dielectric filter 4 includes a dielectric resonator and external coupling means 5 formed thereon, and the dielectric resonator includes a dielectric ceramic 2 having a through hole, and an inner conductor 3a and an outer conductor 3b formed thereon. In FIG. 3, a block dielectric filter is illustrated, but the invented dielectric filter can also be a discrete dielectric filter.

Figure 4:
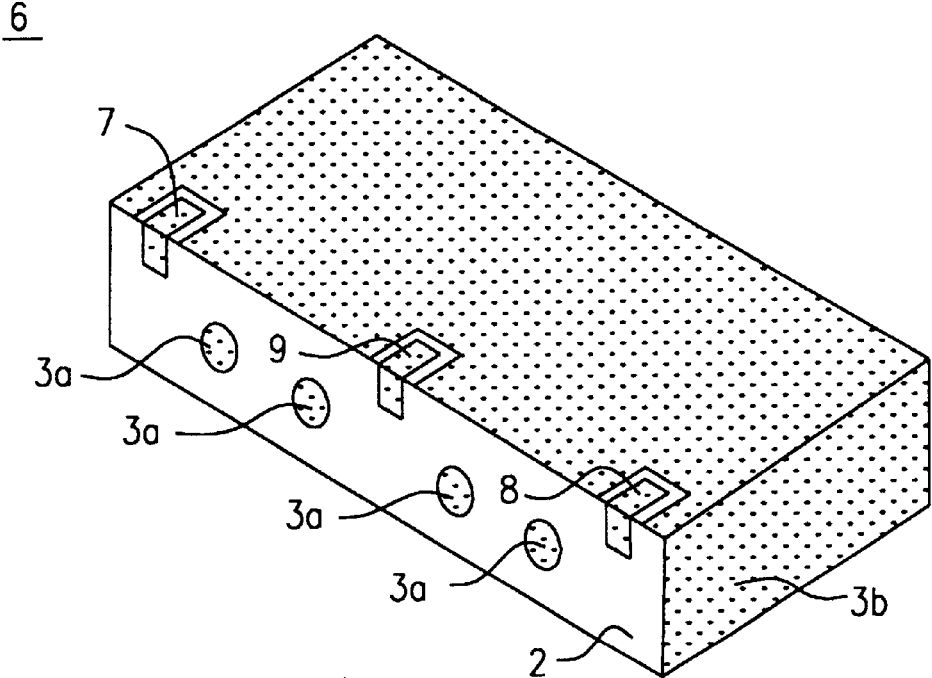
FIG. 4 is a perspective view of an embodiment of a dielectric duplexer according to the present invention.

FIG. 4 is a perspective view of an embodiment of the invented dielectric duplexer. As illustrated in FIG. 4, a dielectric duplexer 6 includes two dielectric filters, an input connecting means 7 which is connected to one dielectric filter, an output connecting means 8 which is connected to the other dielectric filter, and an antenna connecting means 9 which is connected to these dielectric filters in common. Each of the dielectric filters includes a dielectric resonator comprising a dielectric ceramic 2 having a through hole and an inner conductor 3a and an outer conductor 3b formed on the dielectric ceramic 2. In FIG. 4, a block dielectric duplexer is illustrated, but the invented dielectric duplexer can also be a discrete dielectric duplexer.

Figure 5:
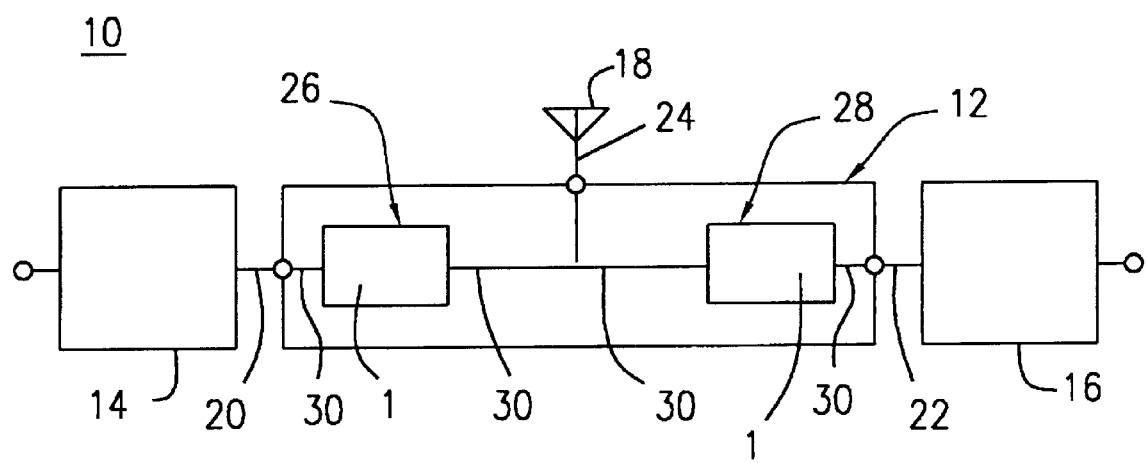
FIG. 5 is a block diagram of an embodiment of a communication system according to the present invention.

FIG. 5 is a block diagram of an embodiment of the invented communication system. The commutation system 10 includes a dielectric duplexer 12, a transmitting circuit 14, a receiving circuit 16, and an antenna 18. The transmitting circuit 14 is connected to an input connecting means 20 of the dielectric duplexer 12, and the receiving circuit 16 is connected to an output connecting means 22 of the dielectric duplexer 12. The antenna 18 is connected to an antenna connecting means 24 of the dielectric duplexer 12. The dielectric duplexer 12 includes two dielectric filters 26 and 28 each including the invented dielectric resonator and an external coupling means connected to the dielectric resonator. In this embodiment, the dielectric filter is formed, for example, by connecting an external coupling means 30 to a dielectric resonator 1. One dielectric filter 26 is connected between the input connecting means 20 and the antenna connecting means 24, and the other dielectric filter 28 is connected between the antenna connecting means 24 and the output connecting means 22.

The invented high frequency dielectric ceramic composition is featured, as mentioned above, by including, as a main component, a complex oxide containing Ba, Ti and at least one of Sm and Nd, and, as secondary components, a Mn compound and a Ta compound.

The ceramic composition preferably includes 100 parts by weight of a main component represented by the following formula:

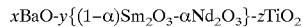

$$x\text{BaO-}y\{(1-\alpha)\text{Sm}_2\text{O}_3\text{-}\alpha\text{Nd}_2\text{O}_3\}\text{-}z\text{TiO}_2$$

wherein x, y, and z are % by mole, and a is a molar ratio, and x, y, z, and α satisfy the following conditions: $13 \leq x \leq 23$; $0 < y \leq 12$; $75 \leq z \leq 83$; $0 \leq \alpha \leq 1$; and x+y+z=100, and, as secondary components, more than 0 and equal to or less than about 0.3 part by weight of a Mn compound in terms of MnO, and more than 0 and equal to or less than about 1 part by weight of a Ta compound in terms of $\text{Ta}_2\text{O}_5$.

The main component in the invented ceramic composition is more preferably represented by the following formula: $x\text{BaO-}y\text{Sm}_2\text{O}_3\text{-}z\text{TiO}_2$, wherein x, y, and z are % by mole and satisfy the following conditions: $17 \leq x \leq 19$; $1 \leq y \leq 6$; $77 \leq z \leq 81$; and x+y+z=100.

By controlling the composition proportion of the dielectric ceramic composition within the above range, the resulting high frequency dielectric ceramic composition has a high relative dielectric constant ($\in_r$) and a high Q value in a microwave region, without significantly sacrificing the Q value even if the relative dielectric constant ($\in_r$) exceeds 40 and becomes about 55, and can control the temperature coefficient of resonant frequency (τf) in the vicinity of zero (ppm/°C.). The concurrent incorporation of a Mn compound and a Ta compound as secondary components can further improve the Q value as compared with the case where a Mn compound alone is incorporated.

In addition, a high frequency dielectric ceramic composition having a further satisfactory thermal shock resistance can be obtained by replacing about 1.5% by mole or less of the Ti element in the main component with Zr.

The present invention will be further illustrated in detail with reference to several examples below, which are not intended to limit the scope of the invention.

EXAMPLE 1

Initially, ceramic compositions were prepared. Starting materials, barium carbonate ($\text{BaCO}_3$), samarium oxide ($\text{Sm}_2\text{O}_3$), neodymium oxide ($\text{Nd}_2\text{O}_3$), titanium oxide ($\text{TiO}_2$), manganese carbonate ($\text{MnCO}_3$) and tantalum oxide ($\text{Ta}_2\text{O}_5$), were weighed and mixed together to yield compositions each containing 100 parts by weight of a main component represented by the formula:

$$x\text{BaO-}y\{(1-\alpha)\text{Sm}_2\text{O}_3\text{-}a\text{Nd}_2\text{O}_3\}\text{-}z\text{TiO}_2$$

wherein x, y, z, and α are as indicated in Table 1, and, as secondary components, a Mn compound and a Ta compound in compositional ratios indicated in Table 1, respectively in terms of MnO and in terms of Ta$_2$O$_5$.

TABLE 1

| Sample No. | x (mol %) | y (mol %) | z (mol %) | α | MnO (part by weight) | Ta$_2$O$_5$ (part by weight) | ∈r | Q | τf (ppm/° C.) |
|---|---|---|---|---|---|---|---|---|---|
| 1 | 17.5 | 3.0 | 79.5 | 0 | 0.1 | 0.5 | 45 | 8570 | +6 |
| 2 | 20.0 | 3.0 | 77.0 | 0 | 0.1 | 0.5 | 44 | 8470 | +15 |
| *3 | 24.0 | 1.0 | 75.0 | 0 | 0.1 | 0.5 | 40 | 7800 | +56 |
| *4 | 12.0 | 5.0 | 83.0 | 0 | 0.1 | 0.5 | Unsintered | | |
| 5 | 17.5 | 1.0 | 81.5 | 0 | 0.1 | 0.5 | 39 | 8000 | +13 |
| *6 | 17.5 | 0 | 82.5 | 0 | 0.1 | 0.5 | 37 | 8500 | +33 |
| 7 | 17.5 | 5.0 | 77.5 | 0 | 0.1 | 0.5 | 51 | 6500 | +8 |
| *8 | 17.5 | 13.0 | 69.5 | 0 | 0.1 | 0.5 | 65 | 2430 | +55 |
| *9 | 21.0 | 3.0 | 76.0 | 0 | 0.1 | 0.5 | 43 | 7330 | +58 |
| *10 | 13.0 | 3.0 | 84.0 | 0 | 0.1 | 0.5 | Unsintered | | |
| *11 | 17.5 | 3.0 | 79.5 | 0 | 0 | 0.5 | 45 | 130 | +10 |
| *12 | 17.5 | 3.0 | 79.5 | 0 | 0.5 | 0.5 | 43 | 1000 | +17 |
| *13 | 17.5 | 3.0 | 79.5 | 0 | 0.1 | 0 | 45 | 3300 | +5 |
| *14 | 17.5 | 3.0 | 79.5 | 0 | 0 | 0 | 44 | 1200 | +12 |
| 15 | 17.5 | 3.0 | 79.5 | 0 | 0.05 | 0.5 | 45 | 6130 | +5 |
| 16 | 17.5 | 3.0 | 79.5 | 0 | 0.25 | 0.5 | 44 | 7430 | +8 |
| 17 | 17.5 | 3.0 | 79.5 | 0 | 0.1 | 0.1 | 45 | 7300 | +6 |
| 18 | 17.5 | 3.0 | 79.5 | 0 | 0.1 | 0.9 | 44 | 7400 | +9 |
| 19 | 15.5 | 9.5 | 75.0 | 0 | 0.1 | 0.5 | 60 | 6400 | +15 |
| 20 | 15.5 | 3.0 | 81.5 | 0 | 0.1 | 0.5 | 40 | 6300 | +18 |
| *21 | 17.5 | 3.0 | 79.5 | 0 | 0.1 | 1.2 | 43 | 3300 | +23 |
| 22 | 17.5 | 3.0 | 79.5 | 0.25 | 0.1 | 0.5 | 43 | 8830 | +8 |
| 23 | 17.5 | 3.0 | 79.5 | 0.50 | 0.1 | 0.5 | 44 | 8280 | +11 |
| 24 | 17.5 | 3.0 | 79.5 | 0.75 | 0.1 | 0.5 | 46 | 8030 | +15 |
| 25 | 17.5 | 3.0 | 79.5 | 1.00 | 0.1 | 0.5 | 47 | 7850 | +18 |
| 26 | 19.5 | 3.0 | 77.5 | 0 | 0.1 | 0.5 | 44 | 8130 | +15 |
| 27 | 17.5 | 7.0 | 75.5 | 0 | 0.1 | 0.5 | 55 | 3600 | +19 |
| 28 | 17.5 | 5.0 | 77.5 | 0 | 0.1 | 0.5 | 51 | 6500 | +8 |
| 29 | 18.0 | 2.0 | 80.0 | 0 | 0.1 | 0.5 | 44 | 8330 | +6 |
| 30 | 17.5 | 3.5 | 79.0 | 0 | 0.1 | 0.5 | 47 | 7400 | +5 |
| 31 | 17.0 | 1.0 | 82.0 | 0 | 0.1 | 0.5 | 39 | 7830 | +13 |
| 32 | 18.0 | 6.0 | 76.0 | 0 | 0.1 | 0.5 | 53 | 5200 | +24 |

Next, each of these material powders was wet-mixed by use of a ball mill, and was dewatered, dried, and was then calcined at 1000° C. to 1200° C. in the air for 1 hour or more to yield a calcined compact. The calcined compact was crushed and was shaped with an organic binder into a disc having a diameter of 15 mm and a thickness of 7.5 mm, and was then fired at 1200° C. to 1400° C. in the air to thereby yield sintered discs.

Each of the above-prepared sintered discs was cut to an appropriate size and was subjected to measurement of relative dielectric constant (∈r) and Q value at a temperature of 25° C. and a frequency of 3 to 7 GHz by a method using a both-ends short-circuited dielectric resonator. In addition, the temperature coefficient of resonant frequency (τf) within a temperature range from 25° C. to 55° C. was determined based on a TE mode resonator frequency. The results of these tests are shown in Table 1. The samples having a sample number with a symbol * in Table 1 are out of the preferred scope of the present invention.

Table 1 shows that the samples within the preferred scope of the present invention have a high relative dielectric constant (∈r) and a high Q value and can control the temperature coefficient of resonant frequency (τf) in the vicinity of zero (ppm/°C.).

The reasons why the above compositional proportions of the invented composition containing a main component represented by the formula: xBaO-y{(1−α)Sm$_2$O$_3$-αNd$_2$O$_3$}-zTiO$_2$, and a secondary component composed of a Mn compound and a Ta compound are preferred will be described below, with reference to Table 1.

In the above formula, x is preferably within a range from about 13 to about 23 inclusive. If x is less than 13, the resulting composition cannot be significantly sintered as in Sample 4, whereas if x exceeds 23, the temperature coefficient of resonant frequency (τf) is increased to the positive side as in Sample 3.

The proportion y is preferably within a range of more than 0 and equal to or less than about 12. If y is 0, the temperature coefficient of resonant frequency (τf) is increased to the positive side as in Sample 6, whereas if y exceeds about 12, the Q value is decreased and the temperature coefficient of resonant frequency (τf) is increased to the positive side as in Sample 8.

The proportion z is preferably within a range from about 75 to about 83 inclusive. If z is less than about 75, the Q value is decreased and the temperature coefficient of resonant frequency (τf) is increased to the positive side as in Sample 8, whereas if z exceeds about 83, the resulting composition cannot be significantly sintered as in Sample 10.

As apparent from the comparison between Samples 1 and 22 to 25, a high relative dielectric constant (∈r) and a high Q value can be obtained within the overall range of 0≦α≦1, although the temperature coefficient of resonant frequency (τf) slightly increases with an increasing α.

The amount of the secondary component Mn compound is preferably more than 0 and equal to or less than about 0.3 part by weight in terms of MnO, relative to 100 parts by weight of the main component. When the amount is 0 part by weight as in Sample 11 and when it exceeds about 0.3 part by weight as in Sample 12, the Q value is decreased.

The amount of the secondary component Ta compound is preferably more than 0 and equal to or less than about 1 part by weight relative to 100 parts by weight of the main component. If the amount is 0 part by weight, the Q value is decreased as in Sample 13, whereas if it exceeds about 1 part by weight, the Q value is decreased and the temperature coefficient of resonant frequency ($\tau f$) is increased to the positive side as in Sample 21.

More preferably, the invented dielectric ceramic composition includes a main component represented by the following formula: $xBaO\text{-}ySm_2O_3\text{-}zTiO_2$ wherein x, y, and z are % by mole and satisfy the following conditions: $17 \leq x \leq 19$; $1 \leq y \leq 6$; $77 \leq z \leq 81$; and $x+y+z=100$, as in Samples 1, 7, 15 to 18, and 28 to 30. By this configuration, the temperature coefficient of resonant frequency ($\tau f$) can be reduced to equal to or less than 10 ppm/°C.

EXAMPLE 2

Initially, ceramic compositions were prepared. Starting materials, barium carbonate ($BaCO_3$), samarium oxide ($Sm_2O_3$), zirconium oxide ($ZrO_2$), titanium oxide ($TiO_2$), manganese carbonate ($MnCO_3$) and tantalum oxide ($Ta_2O_5$), were weighed and mixed together to yield compositions each containing 100 parts by weight of a main component represented by the formula:

$$xBaO\text{-}ySm_2O_3\text{-}z\{(1-m)TiO_2\text{-}mZrO_2\}$$

wherein x, y, z, and m are as indicated in Table 2, and, as secondary components, a Mn compound and a Ta compound in compositional ratios indicated in Table 2, respectively in terms of MnO and in terms of $Ta_2O_5$.

Next, sintered discs were prepared in the same manner as in Example 1. The obtained sintered discs were cut to an appropriate size, and each sample was subjected to a thermal shock test at temperatures between −55° C. to +85° C. for 100 cycles, and was then subjected to microscopic observation to check the presence or absence of microcrack. Relative dielectric constant ($\in r$), Q value and the temperature coefficient of resonant frequency ($\tau f$) of these samples were then determined in the same manner as in Example 1. The results are shown in Table 2.

When m is set at more than 0 and equal to or less than 0.015, that is, about 1.5% by mole or less of the Ti element is replaced with Zr as in Samples 34 and 35 indicated in Table 2, a high frequency dielectric ceramic composition having a satisfactory thermal shock resistance can be obtained while maintaining a high relative dielectric constant ($\in r$) and a high Q value.

The above-prepared sintered discs of Samples 33 to 36 were subjected to quantitative analysis of crystal according to X-ray diffraction method. The results are shown in Table 3.

TABLE 3

| Sample Number | m | Crystal Phase | | | Microcrack no ○, yes x |
| | | $Ba_2Ti_9O_{20}$ (vol %) | $BaTi_4O_9$ (vol %) | $BaSm_2Ti_4O_{12}$ (vol %) | |
|---|---|---|---|---|---|
| 33 | 0 | 30 | 50 | 20 | x |
| 34 | 0.001 | 60 | 20 | 20 | ○ |
| 35 | 0.015 | 80 | 0 | 20 | ○ |
| 36 | 0.030 | 80 | 0 | 20 | ○ |

Table 3 shows that the volume percentage of a $BaTi_4O_9$ phase in the sintered body can be reduced to equal to or less than 20% by replacing a specific amount of the elemental Ti with elemental Zr. It is supposed that $Ba_2Ti_9O_{20}$ and $BaSm_2Ti_4O_{12}$ phases having an equivalent average coefficient of thermal expansion become predominant as crystal phases in the ceramic to thereby improve the thermal shock resistance of the dialectic ceramic composition. In this connection, the $Ba_2Ti_9O_{20}$ and $BaSm_2Ti_4O_{12}$ phases have an average coefficient of thermal expansion of 10 ppm/°C., and the $BaTi_4O_9$ phase has an average coefficient of thermal expansion of 8 ppm/°C.

TABLE 2

| Sample No. | x (mol %) | y (mol %) | z (mol %) | m | MnO (part by weight) | $Ta_2O_5$ (part by weight) | $\in r$ | Q | $\tau f$ (ppm/° C.) | Microcrack no ○, yes x |
|---|---|---|---|---|---|---|---|---|---|---|
| 33 | 17.5 | 3.0 | 79.5 | 0 | 0.1 | 0.5 | 45 | 2730 | +16 | x |
| 34 | 17.5 | 3.0 | 79.5 | 0.001 | 0.1 | 0.5 | 45 | 6400 | +9 | ○ |
| 35 | 17.5 | 3.0 | 79.5 | 0.015 | 0.1 | 0.5 | 45 | 7420 | +7 | ○ |
| 36 | 17.5 | 3.0 | 79.5 | 0.030 | 0.1 | 0.5 | 44 | 2900 | +11 | ○ |
| 37 | 17.5 | 3.0 | 79.5 | 0.050 | 0.1 | 0.5 | 43 | 1200 | +15 | ○ |

EXAMPLE 3

Initially, ceramic compositions were prepared. Starting materials, barium carbonate ($BaCO_3$), samarium oxide ($Sm_2O_3$), praseodymium oxide ($Pr_6O_{11}$), cerium oxide ($CeO_2$), lanthanum oxide ($La_2O_3$), zirconium oxide ($ZrO_2$), titanium oxide ($TiO_2$), manganese carbonate ($MnCO_3$), tantalum oxide ($Ta_2O_5$) and niobium oxide ($Nb_2 O_5$), were weighed and mixed together to yield compositions each containing 100 parts by weight of a main component represented by the formula: $xBaO\text{-}y\{(1-n)Sm_2O_3\text{-}nRe_2O_3\}\text{-}z\{(1-m)TiO_2\text{-}mZrO_2\}$, wherein Re is at least one selected from Pr, Ce and La indicated in Table 4; and x, y, z, n and m are as indicated in Table 4, and, as secondary components, a Mn compound, a Ta compound and a Nb compound in compositional ratios indicated in Table 4, respectively in terms of MnO, $Ta_2O_5$, and $Nb_2O_5$.

TABLE 4

| Sample No. | x (mol %) | y (mol %) | z (mol %) | m | n (Re) | MnO (part by weight) | $Ta_2O_5$ (part by weight) | $Nb_2O_5$ (part by weight) | $\epsilon r$ | Q | τf (ppm/° C.) |
|---|---|---|---|---|---|---|---|---|---|---|---|
| 38 | 17.5 | 3.0 | 79.5 | 0.015 | 0.25 (Pr) | 0.1 | 0.5 | 0 | 43 | 8750 | +5 |
| 39 | 17.5 | 3.0 | 79.5 | 0.015 | 0.25 (Ce) | 0.1 | 0.5 | 0 | 46 | 7700 | +8 |
| 40 | 17.5 | 3.0 | 79.5 | 0.015 | 0.25 (La) | 0.1 | 0.5 | 0 | 45 | 5820 | +6 |
| 41 | 17.5 | 3.0 | 79.5 | 0.015 | 0.50 (La) | 0.1 | 0.5 | 0 | 46 | 7100 | +12 |
| 42 | 17.5 | 3.0 | 79.5 | 0.015 | 0.70 (La) | 0.1 | 0.5 | 0 | 48 | 3200 | +37 |
| 43 | 17.5 | 3.0 | 79.5 | 0.015 | 0.25 (La) | 0.1 | 0.5 | 0.1 | 45 | 7960 | +7 |
| 44 | 17.5 | 3.0 | 79.5 | 0.015 | 0.25 (La) | 0.1 | 0.5 | 0.3 | 45 | 8230 | +7 |
| 45 | 17.5 | 3.0 | 79.5 | 0.015 | 0.25 (La) | 0.1 | 0.5 | 0.5 | 45 | 8860 | +8 |

Next, sintered discs were prepared in the same manner as in Example 1.

Relative dielectric constant ($\epsilon r$), Q value, and the temperature coefficient of resonant frequency (τf) of these samples were then determined in the same manner as in Example 1, and the results are shown in Table 4.

When n is set at more than 0 and equal to or less than about 0.5, that is, about 50% by mole or less of the Sm element is replaced with at least one selected from La, Ce and Pr, as in Samples 38 to 41 in Table 4, the resulting high frequency dielectric ceramic composition can control the temperature coefficient of resonant frequency (τf) in the vicinity of zero (ppm/°C.) and has a high relative dielectric constant ($\epsilon_r$) and a high Q value.

As apparent from the comparison between Samples 40 and 43 to 45 in Table 4, a higher Q value can be obtained by incorporating about 0.5 part by weight or less of a Nb compound in terms of $Nb_2O_5$, relative to 100 parts by weight of the main component.

The invented high frequency dielectric ceramic composition may further comprise additional components such as $Sb_2O_5$, CuO, ZnO, $Al_2O_3$, $Fe_2O_3$, $Bi_2O_3$, PbO, $SiO_2$ and $B_2O_3$. These additional components can be added in an amount of about 5% by weight or less, while the amount depends on the type of the additional component. For example, the addition of $SiO_2$ in an amount of about 0.5 part by weight or less relative to 100 parts by weight of the main component reduces the sintering temperature as compared with the case where $SiO_2$ is not added, and the resulting ceramic composition has less dependency of electric characteristics, particularly of the temperature coefficient of resonant frequency (τf) on sintering temperature, and therefore can be more easily produced.

As thus described above, the present invention can provide a high frequency dielectric ceramic composition which has a high relative dielectric constant ($\epsilon r$) and a high Q value in the microwave region without significant sacrifice of Q value even when the relative dielectric constant ($\epsilon r$) exceeds 40 and becomes about 55, can control the temperature coefficient of resonant frequency (τf) in the vicinity of zero (ppm/°C.), and has a satisfactory thermal shock resistance.

Accordingly, the dielectric resonator, dielectric filter, dielectric duplexer and communication system formed by using the dielectric ceramic including the above composition have satisfactory characteristics, respectively.

Other embodiments and variations will be obvious to those skilled in the art, and this invention is not to be limited to the specific matters stated above.

What is claimed is:
1. A high frequency dielectric ceramic composition comprising:
100 parts by weight of a main component containing Ba, Ti and at least one of Sm and Nd as metal elements and represented by the following formula:

$$xBaO\text{-}y\{(1-\alpha)X_2O_3\text{-}\alpha Nd_2O_3\}\text{-}zX'O_2$$

wherein X is Sm or Sm in combination with up to about 50% by mole of at least one member selected from the group consisting of La, Ce and Pr; X' is Ti or the combination of Ti and up to about 1.5% by mole of Zr; x, y, and z are % by mole; and α is molar ratio; and x, y, z, and α satisfy the following conditions:
$13 \leq x \leq 23$;
$0 < y \leq 12$;
$75 \leq z \leq 83$;
$0 \leq \alpha \leq 1$; and
$x+y+z=100$, and
as secondary components, more than 0 and equal to or less than about 0.3 part by weight of a Mn compound in terms of MnO, and more than 0 and equal to or less than about 1 part by weight of a Ta compound in terms of $Ta_2O_5$.

2. A high frequency dielectric ceramic composition according to claim 1, wherein α is 0 and thereby represented by the formula $$xBaO\text{-}yX_2O_3\text{-}zX'O_2.$$

3. A high frequency dielectric ceramic composition according to claim 2, wherein X' is Ti and more than 0% by mole of Zr.

4. A high frequency dielectric ceramic composition according to claim 3, wherein X is Sm in combination with more than 0% by mole of at least one member selected from the group consisting of La, Ce and Pr.

5. A high frequency dielectric ceramic composition according to claim 2, wherein X' is Ti and X is Sm.

6. A high frequency dielectric ceramic composition according to claim 1, wherein X' is Ti and more than 0% by mole of Zr.

7. A high frequency dielectric ceramic composition according to claim 6, wherein X is Sm in combination with more than 0% by mole of at least one member selected from the group consisting of La, Ce and Pr.

8. A high frequency dielectric ceramic composition according to claim 1, wherein X' is Ti and X is Sm.

9. A high frequency dielectric ceramic composition according to claim 1, further comprising, as a secondary component, about 0.5 part by weight or less of a Nb compound in terms of $Nb_2O_5$, relative to 100 parts by weight of the main component.

10. A dielectric resonator comprising a dielectric ceramic electromagnetically coupled to an input-output terminal, wherein said dielectric ceramic comprises the high frequency dielectric ceramic composition of claim 1.

11. A dielectric resonator according to claim 10, having a copper conductor on a surface of said dielectric ceramic.

12. A dielectric filter comprising the dielectric resonator of claim 10, in combination with an external coupling means.

13. A dielectric duplexer comprising:

at least two dielectric filters;

input-output connector connected to each of said dielectric filters respectively; and an antenna connector being connected to said dielectric filters in common, wherein at least one of said dielectric filters is the dielectric filter of claim 12.

14. A communication system comprising:

the dielectric duplexer of claim 13;

a transmitting circuit connected to at least one input-output connector of said dielectric duplexer;

a receiving circuit connected to at least one input-output connector other than said input-output connector connected to said transmitting circuit; and an antenna connected to an antenna connector of said dielectric duplexer.

\* \* \* \* \*